INVENTOR.
Erich Goldbohm
Gerhard Prins
Nico Schimmel
BY
Fred M Vogel
Agent

United States Patent Office 2,915,749
Patented Dec. 1, 1959

2,915,749

RADAR RECEIVER COMPRISING A POSITION INDICATOR

Erich Goldbohm, Gerhard Prins, and Nico Schimmel, Noordwijk, Netherlands, assignors, by mesne assignments, to North American Philips Company, Inc., New York, N.Y., a corporation of Delaware Application January 2, 1953, Serial No. 329,196

Claims priority, application Netherlands January 18, 1952

6 Claims. (Cl. 343—17)

The invention relates to a radar system comprising a plan position indicator to reproduce the images of reflecting objects. In a system of this type echo signals derived from the reflecting objects are applied to a cathode-ray tube having an afterglow indicator screen to provide a variable indication of these objects in accordance with their direction and distance as plotted in polar co-ordinates, provision being made of one or more calibrating mark generators for the reproduction of direction and/or distance calibrating marks on the screen.

Such radar systems comprising a plan position indicator (P.P.I.) are used, for example, in ports and airfields and the invention has for its object to provide an improvement in such a radar system, increasing materially its possibilities for use and testing. This is particularly of importance for systems used in ports. However, the invention may also be carried out with other radar systems, for example, with airplane and ship radar systems.

The radar system of the kind described in the preamble is characterised, in accordance with the invention, by an echo signal suppressing switch to render inoperative the received echo signals, which normally control the cathode-ray tube, the apparatus being otherwise operative, and by an eccentric voltage generator, controlled by an eccentric switch, for the reproduction of a plotting image with calibration marks onto an afterglowing echo image having a center which is shifted in position relative to the normal image center.

By using the invention with, for example, a radar system of a port, an azimuth line, preferably having distance calibrating marks, intersecting two arbitrarily chosen image points, for example, the mouth of the port and a vessel to be entered, may be reproduced, by electronic means, on the luminescent panorama image of the port and its surroundings. After the radar receiver has been switched back from "plotting image" to the normal panorama image, the previously produced azimuth line having distance calibrating marks, remains observable for a comparatively long time, owing to the afterglow properties of the indicator screen, particularly if these calibrating marks were reproduced with particularly great intensity. Thus, some time after having switched back to the normal panorama image it may be observed and reported how far the vessel deviates from the desired course. The accuracy thus obtained is quite sufficient for practical purposes, since both the panorama image and the calibrating marks are produced by electronic means, so that no parallax errors can occur.

It should be noted that the switching-over from normal panorama image to calibrating image and conversely, need not be synchronized with respect to the transmitter pulses or the panorama scanning cycles, which renders the practical use of the invention comparatively simple.

Further, according to the invention several pilot lines, forming together a broken course line, may be projected onto a panorama image of a river sector. For piloting a vessel, deviations from such a course line may be reported. The position of the pilot lines in the radar image may be checked in a simple manner by observing the image points of the panorama image corresponding to the position of navigation lights, for which purpose, the latter may, if desired, be provided with radar reflectors.

The use of the invention permits at the same time a simple and very effective check of the linearity of the radar image by projecting a series of distance circles with different image centers. If the relative distance between the image centers is equal to the relative distance between two calibrating circles or is a multiple thereof, the various calibrating circles will be in contact with one another at previously given points in the case of linearity of the image reproduced.

The invention furthermore makes it possible to carry out triangulation measurements in luminescent radar images.

In order that the invention may be readily carried into effect, it will now be described in detail with reference to the accompanying drawings.

Figure 1:
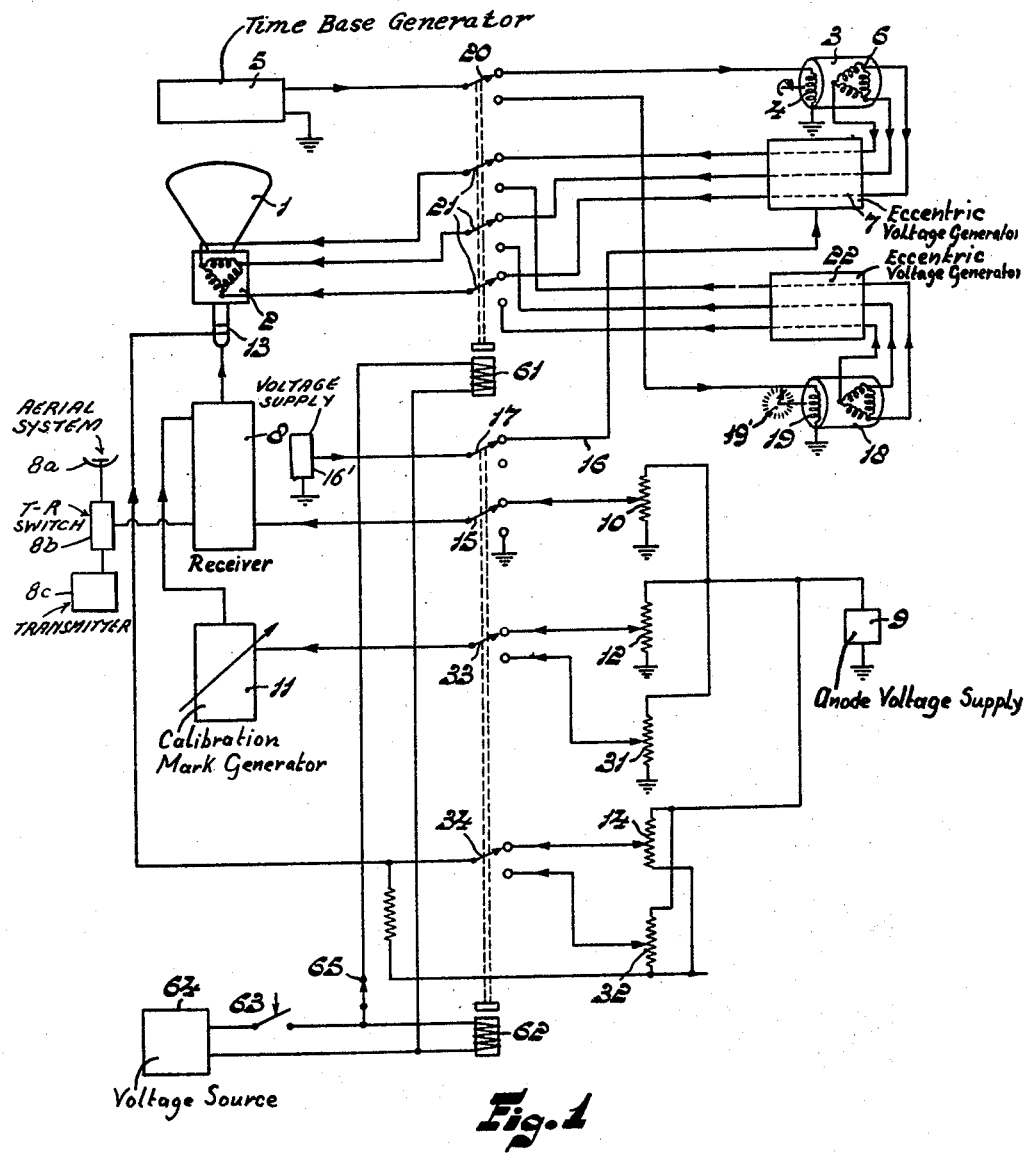
Fig. 1 shows mainly in block diagram a preferred embodiment of the receiving and indicating portions of a radar system according to the invention.

The radar system according to the invention, shown in Fig. 1, comprises a cathode-ray tube 1, used as an indicator tube, comprising a luminescent image screen, the electron beam of which can be deflected along a radius sector rotating about an image center by means of a stationary deflection coil system 2. For this purpose the stationary coil system having the deflection coils arranged in delta connection is connected to a selsyn generator 3, the rotor 4 of which follows the aerial scanning movement and is connected to a time-base generator 5. The stator 6 of the selsyn generator 3 is connected via an eccentric voltage generator 7 to the stationary deflection coil system 2 of the cathode-ray tube. A possible detail form of the eccentric voltage generator is explained with reference to Fig. 2.

An intensity-control electrode of the cathode-ray tube 1 is connected to a radar echo pulse receiver 8, the input circuit of which is connected to a rotary aerial system 8a having a sharply concentrated directional characteristic. This aerial system is connected to the receiver 8 and to a transmitter 8b via a transmit-receive switch 8c in a conventional manner. The receiver may be constructed in conventional manner and be provided, for example, with an intermediate-frequency amplifier stage comprising screen grid tubes, the screen grid supply voltage being variable by means of a potentiometer 10, connected to an anode voltage source 9, in order to control the intensity of the echo signals.

To the signal circuit of the cathode-ray tube there is also connected a calibrating mark generator 11 via the output stage of the receiver 8. The strength of the calibrating marks supplied by the calibrating mark generator 11 may be controlled by means of a potentiometer 12 connected to the aforesaid anode voltage source 9. The calibrating mark generator 11 supplies calibrating pulses corresponding to given distances of the radar image center, so that on the panorama image of the indicator screen of the cathode-ray tube 1 distance circles are drawn.

For the control of the mean brightness of the image obtained, an intensity control electrode 13 of the cathode-ray tube 1 is connected via a potentiometer 14 to the anode voltage source 9.

The radar system so far described is suitable for reproducing panorama images on an indicator screen of the cathode-ray tube 1, several distance circles being drawn by electronic means in the panorama image, the image center being eccentric with respect to the center of the indicator screen by a suitable choice of the output voltages of the eccentric voltage generator 7.

According to the invention the echo signals initiating from the receiver 8 may be suppressed, the remaining apparatus being operative, by means of a switch included in the screen grid supply voltage line connected to potentiometer 10. The operation of this switch disconnects the screen grids of the amplifying tubes of the intermediate-frequency amplifier from potentiometer 10 and connects them to ground thus suppressing the echo signals. However, owing to the afterglow properties of the indicator screen the radar image obtained previously on the image screen of the cathode-ray tube is still visible. Onto the luminescent radar image an azimuth line may now be projected by electronic means, starting from an image center deviating from the normal image center. For this purpose an interruption switch 17 is coupled with the switch 15 in the supply lead 16 of the eccentric voltage generator 7, this switch being connected to a voltage supply 16'. After the switch 17 has been switched out of the position shown, the eccentric voltage generator no longer supplies output voltages and the image center will then coincide with the center of the indicator screen. For the reproduction of an azimuth line (cursor) starting from the latter center an additional, manually adjustable selsyn generator 18 is provided, the rotor 19 of which may be connected to the time-base generator 5 by means of a switch 20, instead of the rotor 4 of the selsyn generator 3. To the switch 20 arranged three switches 21, included in the supply leads of the stationary deflection coil system 2 in order to connect the deflection coil systems to the stator of the selsyn generator 18. It should be noted that the stator of the selsyn generator 18 is connected to the deflection coil systems via an additional eccentric voltage generator 22, which, however, remains provisionally out of consideration.

Figure 3:
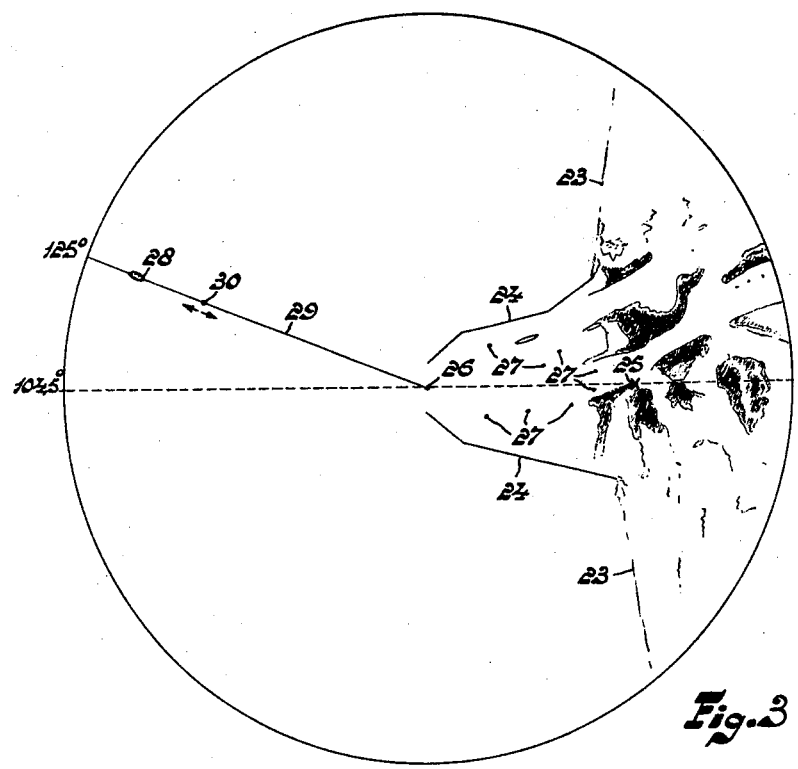
Figs. 3 to 6 illustrate radar images obtained in different uses according to the invention.

With reference to Fig. 3 a radar image obtained by the system described above is now explained.

The radar image shown in Fig. 3 is the image of a port with coast line 23 and piers 24. The radar system is installed at a point 25, indicated by a cross. The radar image is arranged, by using the eccentric voltage generator 7, shown in Fig. 1, eccentrically with respect to the indicator screen in a manner such that the center 26 of the mouth of the port between the ends of the piers 24 exactly coincides with the center of the indicator screen. Between the piers 24 are visible buoys 27 and a vessel 28 is indicated in front of the mouth of the port.

According to the invention the azimuth and the distance of the vessel 28 from the mouth of the harbor are determined as follows:

By changing over the switch 15 the echo signals producing the normal panorama image are suppressed and, at the same time, the normally operative selsyn generator 3 is replaced by the manually adjustable selsyn generator 18. Thus a cursor line 29 becomes visible on the luminescent radar image; this line starts from the center of the indicator screen, since the eccentric voltage generator 7 becomes inoperative, and coincides with the point 26 at the mouth of the port. The azimuth of the cursor line 29 may be adjusted by the adjustment of the rotor 19 of the selsyn generator 18 in a manner such that the cursor line 29 intersects the vessel image 28 in the luminescent radar image. By using the calibrating mark generator 11 a variable distance point 30 may be projected on the cursor 29; this point may be shifted in position by the adjustment of the calibrating mark generator, until it coincides with the spot 28 of the luminescent radar image. Reading of the adjustment of the selsyn generator 18 from a scale 19' operative in conjunction with rotor 19 and reading of the adjustment of the calibrating mark generator 11 from a scale division (not shown) in Fig. 1 gives the azimuth and the distance of the vessel 28 from the mouth of the port; these data may be transferred by radio telephone to the vessel. The alternate projection of the normal panorama image and the plotting image may, if desired, be performed automatically; it is then to be considered that the plotting image projection requires only a fraction of, for example, the scanning time of the panorama image. It is desirable to produce the calibrating marks in the plotting image with compratively great brightness in order to ensure that, after switching back to the normal panorama image, the calibrating marks previously produced remain visible for a comparatively long time owing to the afterglow properties of the indicator screen. For this purpose the apparatus shown in Fig. 1 is provided with two additional potentiometers 31 and 32, which are substituted, by means of switches 33 and 34, for the potentiometers 12 and 14 and which serve to control the intensity of the calibrating marks from the calibrating mark generator 11 and to control the brightness of the cursor line 29 respectively. The switches 33 and 34 are preferably coupled with the switches 15 and 17.

In the description given with reference to Fig. 3, it is assumed that by means of the eccentric voltage generator 7 the normal radar image is reproduced with a certain degree of eccentricity with respect to the indicator screen. However, if the normal radar image is not produced eccentrically, for example, owing to the absence of the eccentric voltage generator 7, the plotting to be performed may yet be carried out in analogous manner by using the eccentric voltage generator 22, which is connected to the additional selsyn generator 18. In this case the cursor line 29 with variable distance mark 30 is reproduced in the radar image from an image center, which is then eccentric and which coincides, as before, with the mouth of the port 26.

If the normal radar image is produced eccentrically and the ploting is to be performed for a vessel with respect to an image point not coinciding with the center of the indicator screen, the two eccentric voltage generators 7 and 22 are required, which will be obvious without further explanation.

In such a case it would, in principle, be possible to use a single eccentric voltage generator and to vary its adjustment to perform a plotting; however, for a rapid performance it is more efficient to use two separate eccentric voltage generators.

Figure 2:
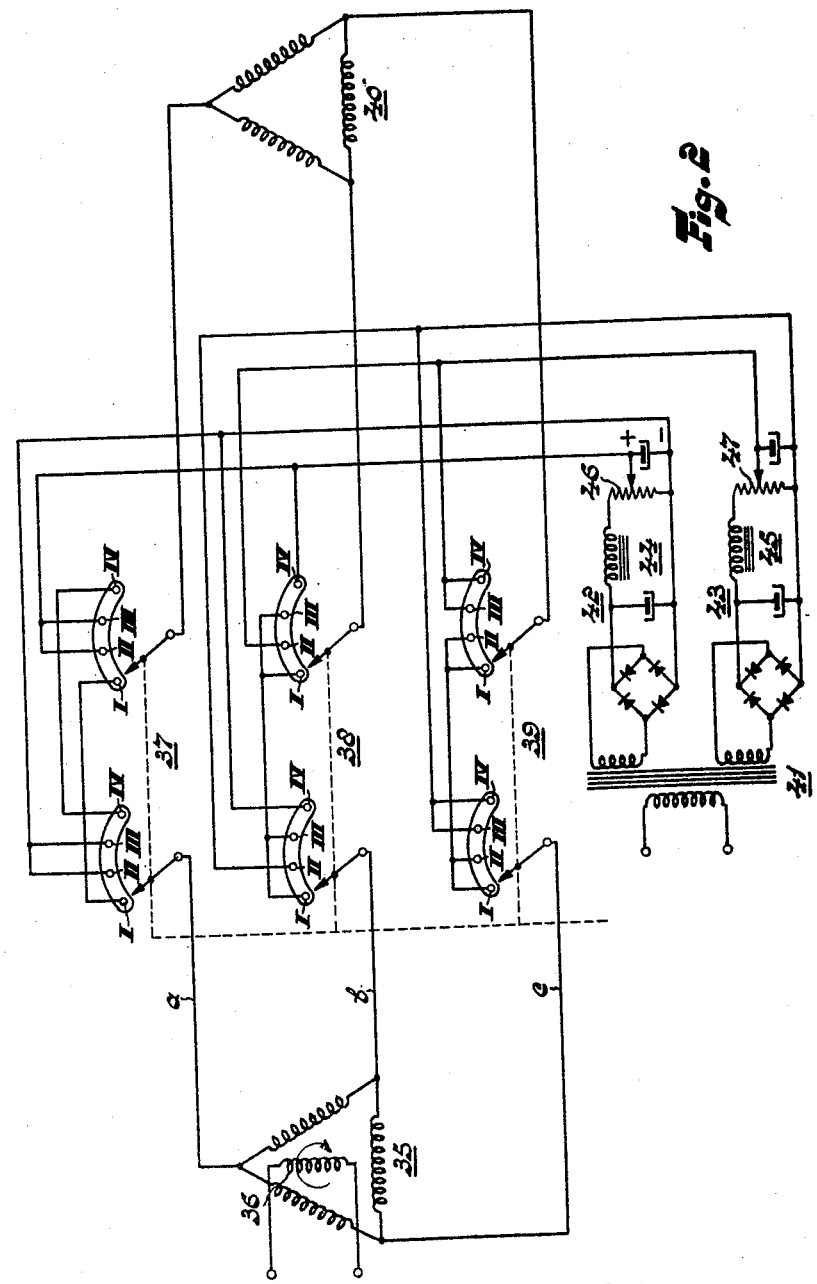
Fig. 2 is a detail circuit-diagram of an eccentric voltage generator and its connection to a selsyn system.

A preferred form of the eccentric voltage generators 7 and 22 is shown in detail in Fig. 2. In this figure reference numeral 35 designates a selsyn generator, the rotor 36 of which is adapted to be connected to a time-base generator. The stator coils are connected in delta (or star), the corners being connected via leads $a$, $b$ and $c$ and mechanical switches 37, 38 and 39 to the corresponding corners of a deflection coil system 40 in delta (or star). In order to obtain the eccentricity of the electronic image direct voltages of adjustable values may be introduced each time in two of the three connecting leads of the selsyn generator 35 and the deflection coil system 40. These direct voltages are produced by means of rectifiers 42 and 43, comprising smoothing filters 44 and 45 and adjustable output potentiometers 46 and 47, connected to a main transformer 41. The switches 37, 38 and 39 have four positions, indicated by I, II, III and IV. In switch position I, as shown in Fig. 2, no direct voltages are introduced in the connecting leads $a$, $b$ and $c$ so that the electronic image obtained has a center coinciding with the center of the indicator screen.

The positions II, III and IV serve to obtain eccentricity in three different sectors of 120° of the indicator screen.

In the position II of the switches no direct voltage is introduced into the connecting lead c, however, into the connecting lead a is introduced a direct voltage of adjustable value initiating from potentiometer 46 and into the connecting lead b is introduced a direct voltage of adjustable value from potentiometer 47. Thus any eccentricity of the image may be obtained in a sector of, for example, 0 to 120° of the indicator screen. In the position III of the switches 37, 38 and 39 no direct voltage is introduced into the lead b, however, into the connecting leads a and c are introduced relatively independent, adjustable direct voltages from potentiometers 46 and 47 respectively. In this position of the switches an eccentricity may be adjusted in the sector from 120° to 240°. In the position IV of the switches 37, 38 and 39 no direct voltage is introduced into the connecting lead a, however, it is introduced into the leads b and c and the eccentricity is adjustable in a sector from 240° to 360° of the indicator screen.

Figure 4:
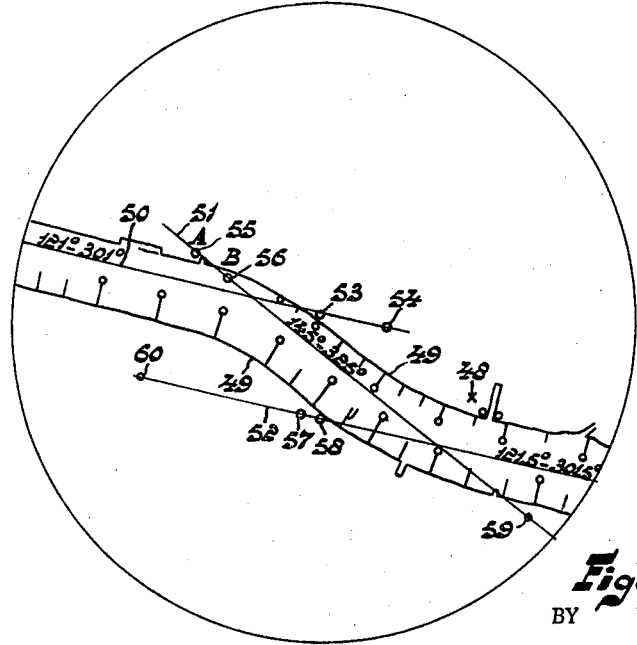

With reference to Fig. 4 one use of the invention with a radar image of a river sector will now be described. In the panorama image shown in Fig. 4 an eccentric image center is normally used and the installation area of the radar apparatus is indicated at 48. The banks of the river and the groynes are visible at 49 and the image furthermore shows pilot lines 50, 51 and 52 forming together a broken navigation line. The pilot line 50 intersects beacon lights 53 and 54; the pilot line 51 intersects beacon lights 55 and 56 and the pilot line 52 intersects beacon lights 57 and 58. The pilot lines 50, 51 and 52 may be drawn rapidly in succession by electronic means in the luminescent radar image as cursor lines starting each time from other image centers with the use of the additional selsyn generator 18 and one or more additional eccentric voltage generators. The correct positions of the pilot lines 51 and 52 in the radar image may be checked by means of additional radar reflectors 59 and 60, arranged at suitable points. By reproducing the pilot lines in the "plotting" image with comparatively great intensity by means of potentiometer 32, shown in Fig. 1, they will remain visible for a long time after the apparatus has been switched back to the normal radar image, so that during the afterglow of the pilot lines any deviations from the desired course line may be reported to the vessel by radio telephone.

In order to perform a rapid change-over from the normal image to the plotting image with shifted image center, it is desirable to construct the switches shown in Fig. 1 in the form of relay contacts of relays to be controlled by a foot switch. As is shown in Fig. 1, the switches 20 and 21 are adapted to be controlled by means of a relay 61 and the switches 15, 17, 33 and 34 by means of a relay 62. The energizing circuits of the two relays are connected via a foot switch 63 to a voltage supply 64. The energizing circuit of relay 61 may, at will, be made operative or inoperative by means of a switch 65. The latter is normally closed, but is opened if a check of the linearity of the radar image is required.

Figure 5:
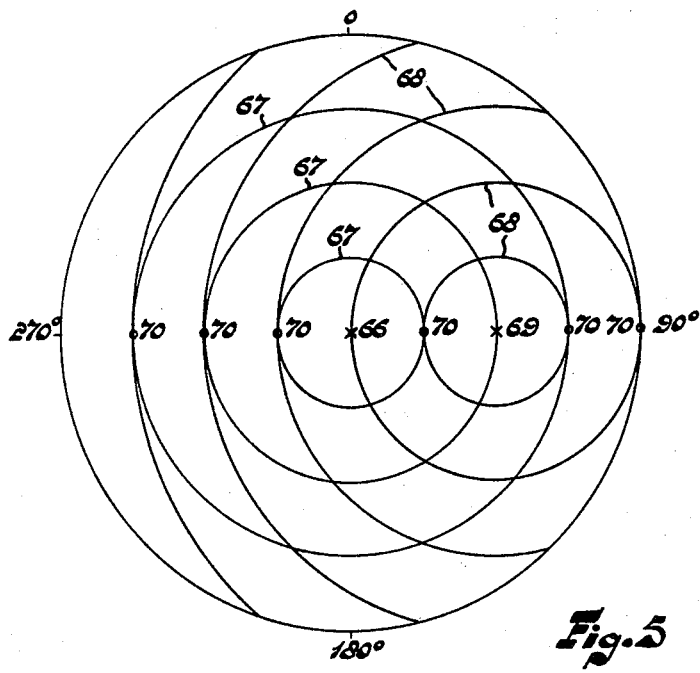

This is explained with reference to Fig. 5.

The foot switch 63 being closed and the switch 65 being opened, the rotating selsyn generator 3 is operative and the eccentric voltage generator 7 is inoperative by opening the switch 17 and by changing over the switch 15 the echo signals are suppressed. Then, if the calibrating mark generator 11 is operative, calibrating circles 67 are drawn on the indicator screen from the center indicated in Fig. 5 by 66. If the foot switch is now opened, the eccentric voltage generator 7 becomes again operative and besides the normal radar image calibrating circles 68 about the image center 69 are produced. If the eccentric voltage generator 7 is adjusted in a manner such that the image centers 66 and 69 are shifted through a distance corresponding to twice the distance of successive calibrating circles, the calibrating circles 68 must exactly touch the luminescent calibrating circles 67 at the points 70. If there are no deviations from linearity in the radar image, the various series of distance circles will touch one another invariably as indicated in Fig. 5. Thus a simple check of the linearity of the radar image can be performed and it may be effected in various directions, after which the errors of linearity stated may be corrected by re-adjusting the deflection coil system and/or the time-base generator.

Figure 6:
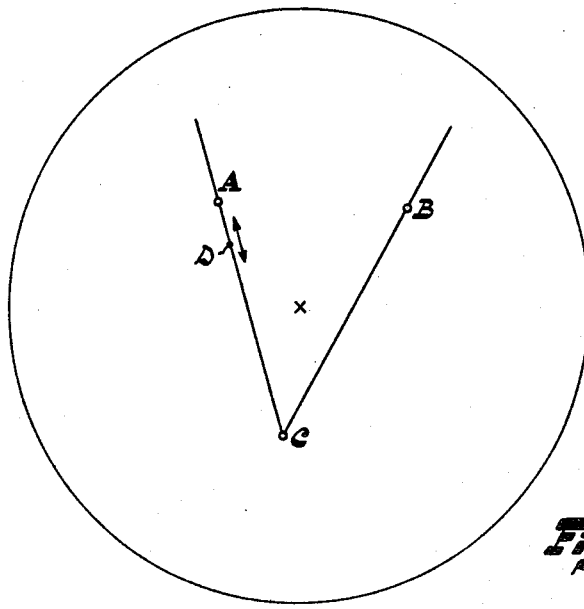

Fig. 6 illustrates how the present invention may be used to perform triangulation measurements. If a projected panorama image having an image center indicated by a cross has three arbitrarily located image points A, B and C, in which the angle ACB is to be measured, the image center may be shifted to point C, after the echo signals normally controlling the panorama indicator have been suppressed, with the use of the eccentric voltage generator 22, shown in Fig. 1. By means of the selsyn generator 18, shown in Fig. 1, cursor lines CA and CB may be projected in the luminescent radar image from point C. The angular displacement of the line CA to the position CB, and hence the angle ACB, can be read from the scale division 31 of the selsyn generator 18, shown in Fig. 1.

At the same time a variable distance point D may be projected on the cursor line CA in order to determine the distance CA, after which the position of the point A with respect to points B and C is completely determined.

With the embodiment described with reference to Figs. 1 and 2 the indicator is provided with a stationary deflection coil system. It will be obvious that the invention may be used in an analogous manner, if the indicator is provided with other deflection means, for example, stationary electrostatic deflection plates.

While we have thus described our invention with specific examples and embodiments thereof, other modifications will be readily apparent to those skilled in the art without departing from the spirit and the scope of the invention as defined in the appended claims.

What we claim is:

1. In a radar system wherein signals radiated by a scanning aerial are reflected by objects to produce echo signals which are intercepted by said aerial, apparatus to indicate the location of said objects comprising a receiver coupled to said aerial to detect said echo signals, a cathode-ray tube having stationary beam deflection elements and an afterglow screen, a time-base voltage generator, a selsyn transmitter having a rotor coil and stator coils, means coupling said rotor coil to said aerial for mechanical movement in accordance with said scanning, means coupling said generator to said rotor coil to apply said time-base voltage thereto, an eccentric voltage generator, means coupling said stator coils to said deflection elements through said eccentric generator to develop on said screen a panoramic image of said objects in a polar coordinate system whose center which represents the position of the radar system is eccentric relative to the geometric center of said screen, means including a switch to suppress the application of echo signals to said tube, and means to produce during said suppression a ploting image on said screen whose center corresponds to said geometric center.

2. Apparatus, as set forth in claim 1, wherein said last-named means includes an additional selsyn transmitter, and an eccentric operation switch to connect said additional selsyn to said deflecting elements in lieu of the main selsyn transmitter, the rotor of said additional selsyn transmitter being adjustable independently of said scanning aerial.

3. Apparatus, as set forth in claim 1, wherein said cathode-ray tube is further provided with a beam intensity control member, and means coupled to said echo signal suppressing switch to apply a first adjustable voltage to said intensity control member when said echo signal is suppressed and to apply a second adjustable voltage thereto when said echo signal is not suppressed.

4. Apparatus, as set forth in claim 1, wherein said cathode-ray tube comprises a beam intensity control member, said apparatus including a calibration mark generator connected to said beam intensity control member and provided with voltage responsive means to control the magnitude of said calibration marks, and further including means coupled to said echo signal suppressing switch to apply a first control voltage to said control means when said echo signals are suppressed and a second control voltage thereto when said echo signals are not suppressed.

5. Apparatus, as set forth in claim 1, further including an electromagnetic device to actuate said suppression switch, and means including a foot switch to energize said device.

6. In a radar system wherein signals radiated by a scanning aerial are reflected by objects to produce echo signals which are intercepted by said aerial, apparatus to indicate the location of said objects comprising a receiver coupled to said aerial to detect said echo signals, a cathode-ray tube having stationary beam deflection elements and an afterglow screen, a time-base voltage generator synchronized with the scanning of said aerial and connected to said deflection elements to cause deflection of the cathode-ray of said tube with respect to said screen, means connected to modulate said cathode-ray in accordance with the echo signals detected by said receiver thereby to provide on said screen a panoramic image of said objects in a polar coordinate system having a center which represents the position of said radar system, an eccentric voltage generator synchronized with the scanning of said aerial and connected to said deflection elements thereby to cause said center of the polar coordinate system to be eccentric relative to the geometric center of said screen, means including a switch to suppress the application of echo signals to said tube, and means to produce during said suppression a plotting image on said screen whose center corresponds to said geometric center.

References Cited in the file of this patent
UNITED STATES PATENTS

| | | |
|---|---|---|
| 2,405,231 | Newhouse | Aug. 6, 1946 |
| 2,483,644 | Kelsey | Oct. 4, 1949 |
| 2,610,319 | Page | Sept. 9, 1952 |
| 2,712,647 | Sherwin | July 5, 1955 |